United States Patent
Romana et al.

(10) Patent No.: US 9,884,679 B2
(45) Date of Patent: Feb. 6, 2018

(54) AIRCRAFT STEERING SYSTEM CONTROLLER

(71) Applicants: AIRBUS OPERATIONS LIMITED, Bristol (GB); AIRBUS OPERATIONS SAS, Toulouse (FR)

(72) Inventors: Louis-Emmanuel Romana, Bristol (GB); Miguel Angel Gama, Bristol (GB)

(73) Assignees: Airbus Operations Limited, Bristol (GB); Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 15/205,436

(22) Filed: Jul. 8, 2016

(65) Prior Publication Data

US 2017/0008619 A1   Jan. 12, 2017

(30) Foreign Application Priority Data

Jul. 8, 2015 (GB) .................................. 1511966.2

(51) Int. Cl.

| | |
|---|---|
| *B64C 25/50* | (2006.01) |
| *B64C 25/48* | (2006.01) |
| *G05D 1/00* | (2006.01) |
| *G05D 1/02* | (2006.01) |
| *B64C 13/16* | (2006.01) |

(52) U.S. Cl.
CPC .............. *B64C 25/50* (2013.01); *B64C 13/16* (2013.01); *B64C 25/48* (2013.01); *G05D 1/0083* (2013.01); *G05D 1/0204* (2013.01); *Y02T 50/44* (2013.01)

(58) Field of Classification Search
CPC ......... B64C 25/50; B64C 25/48; B64C 13/16; G05D 1/0083; G05D 1/0204; Y02T 50/44
USPC ............................................................ 701/3
See application file for complete search history.

(56) References Cited

U.S. PATENT DOCUMENTS

| | | |
|---|---|---|
| 3,208,694 A | 9/1965 | Joyner |
| 4,006,870 A | 2/1977 | Boone et al. |
| 4,180,223 A | 12/1979 | Amberg |
| 4,221,350 A * | 9/1980 | Moser ................. G05D 1/0083 244/103 W |

(Continued)

FOREIGN PATENT DOCUMENTS

| | | |
|---|---|---|
| EP | 1 574 923 | 9/2005 |
| EP | 2 444 318 | 4/2012 |

(Continued)

OTHER PUBLICATIONS

European Search Report cited in 16 17 7438, completed Dec. 9, 2016, 8 pages.

(Continued)

*Primary Examiner* — Brian P Sweeney
(74) *Attorney, Agent, or Firm* — Nixon & Vanderhye P.C.

(57) ABSTRACT

A controller for an aircraft steering system, the controller being configured to receive a steering input representative of a desired direction of travel of a steerable nose landing gear, and to receive one or more force-based inputs representative of lateral forces acting upon the nose landing gear, wherein the controller is adapted to automatically adjust the steering input based upon the force-based input(s) so as to output an adjusted steering command for a steering actuator of the nose landing gear.

21 Claims, 6 Drawing Sheets

(56) References Cited

U.S. PATENT DOCUMENTS

| | | |
|---|---|---|
| 4,482,961 A | 11/1984 | Kilner et al. |
| 6,722,610 B1 | 4/2004 | Rawdon et al. |
| 2003/0125848 A1 | 7/2003 | Otake et al. |
| 2008/0188998 A1 | 8/2008 | Venios et al. |
| 2011/0004376 A1 | 1/2011 | Chatrenet et al. |
| 2012/0046834 A1 | 2/2012 | Lemay et al. |
| 2014/0156113 A1 | 6/2014 | Benmoussa et al. |
| 2014/0244076 A1* | 8/2014 | Murthy ................. B64C 25/50 701/3 |

FOREIGN PATENT DOCUMENTS

| | | |
|---|---|---|
| EP | 2 623 417 | 8/2013 |
| GB | 2 437 042 | 10/2007 |
| WO | 94/07743 | 4/1994 |

OTHER PUBLICATIONS

Search Report cited in GB Patent Application No. 1511966.2 dated Jan. 8, 2016, three pages.

\* cited by examiner

| Variable | Description | Units |
|---|---|---|
| $BG$ | Measured Brake Gain | Nm/Bar |
| $DB_{ACTIVE}$ | DB Activation for Slip Protection | wu |
| $F_{AC}*$ | AC X-Force Command | N |
| $Fx$ | LG Actuation X-Force | N |
| $Fx*$ | X-Force Command for ATA32 | N |
| $Fx,y,z_M$ | MLG X-, Y-, or Z-Force | N |
| $Fx,y,z_N$ | NLG X-, Y-, or Z-Force | N |
| $Fx_c$ | Corrected X-Force | N |
| $Fx_{NLG}$ | LG Reaction X-Force | N |
| $Fx_M*$ | MLG X-Force Command | N |
| $Fx_{max}$ | Max X-Force at ATA32-level | N |
| $Fy_N*$ | NLG Y-Force Command | N |
| $Fy_{N\,max}$ | Max NLG Y-Force due to Slip Protection | N |
| $BSCS_{Status}$ | BSCS operating status | wu |
| $Mz$ | LG Actuation Z-Moment | Nm |
| $Mz*$ | Z-Moment Command for ATA32 | Nm |
| $Mz_{AC}*$ | AC Z-Moment Command | Nm |
| $Mz_c$ | Corrected Z-Moment | Nm |
| $Mz_{DB\,max}$ | Max Moment due to DB | Nm |
| $Mz_{MLG}$ | LG Reaction Z-Moment | Nm |
| $Mz_{St\,max}$ | Max Moment due to Steering | Nm |
| $P_{COM}$ | Brake Pressure Command | Bar |
| $P_W$ | Brake Pressure | Bar |
| $r$ | Yaw Rate | deg/s |
| $r*$ | Yaw Rate Command | deg/s |
| $S_{NW}$ | Nose Wheel Slip Angle | deg |
| $Te_W$ | Brake Temperature | degC |
| $T_{LG}*$ | LG Torque Command | Nm |
| $T_W$ | Braking Torque | Nm |
| $T_W*$ | Brake Torque Command | Nm |
| $U$ | AC Longitudinal Speed | m/s |
| $U*$ | Speed Command | m/s |
| $U'$ | AC Acceleration | m/s2 |
| $U'*$ | Acceleration Command | m/s2 |
| $V$ | AC Lateral Speed | m/s |
| $\beta$ | NLG DoT Command | deg |
| $\theta_{NW}$ | Nose Wheel Angle | deg |
| $\theta_{NW}*$ | Nose Wheel Angle Command | deg |
| $\theta$ | Optimisation Coefficients | wu |
| $\kappa$ | Moment Dispatch Coefficient | wu |
| $\kappa_{DB}$ | DB Authority | wu |

FIG. 4

AIRCRAFT STEERING SYSTEM CONTROLLER

RELATED APPLICATION

This application claims priority to Great Britain patent application GB 1511966.2, filed Jul. 8, 2015, the entirety of which is incorporated by reference.

FIELD OF THE INVENTION

The present invention relates to a controller for an aircraft steering system, an aircraft steering system and a method for steering an aircraft.

BACKGROUND OF THE INVENTION

A typical aircraft has landing gear comprising a plurality of undercarriages which support the aircraft when it is on the ground. The undercarriages are used to control the movement of the aircraft during ground manoeuvres such as landing, taxiing and take off. Some of the undercarriages have braking wheels which are operable to provide a braking force to decelerate the aircraft when a braking torque is applied by a set of brakes. One of the undercarriages has a steering wheel which may be rotated to steer the aircraft.

During some ground manoeuvres, the steering wheel may start to skid when it is rotated to steer the aircraft, particularly if the aircraft is operated during adverse runway conditions. If the steering wheel starts to skid, its ability to generate lateral forces to turn the aircraft is reduced, therefore reducing the turning performance of the aircraft. Corrective action may be required to reduce the steer angle of the steering wheel and reduce skidding, increasing the workload of the pilot and/or control systems controlling the steering wheel.

During some ground manoeuvres, the aircraft may experience unintended changes in direction, for example due to external factors such as cross-winds, gusts and variations in a runway surface, as well as aircraft factors such as uneven tyre pressure, asymmetric braking, asymmetric engine thrust or component failures. Asymmetric braking refers to an unintentional difference in braking forces generated either side of an aircraft centre line resulting in an unintended yaw moment If an aircraft experiences an unintended change in direction, corrective action may be required to restore the aircraft to the desired heading, increasing the workload of the pilot and/or control systems controlling the steering wheel.

Aircraft undercarriages are typically designed conservatively to withstand significant variations in loading during ground manoeuvres. This conservative design can result in a significant weight penalty, therefore decreasing aircraft fuel efficiency.

It is therefore desirable to provide a steering system for an aircraft which addresses these problems and enables an aircraft to perform ground manoeuvres with maximum efficiency within a prescribed performance envelope.

SUMMARY OF THE INVENTION

A first aspect of the invention provides a controller for an aircraft steering system, the controller being configured to receive a steering input representative of a desired direction of travel of a steerable nose landing gear, and to receive one or more force-based inputs representative of lateral forces acting upon the nose landing gear, wherein the controller is adapted to automatically adjust the steering input based upon the force-based input(s) so as to output an adjusted steering command for a steering actuator of the nose landing gear.

A further aspect of the invention provides a method for steering an aircraft, the method comprising automatically adjusting a steering input representative of a desired direction of travel of a steerable nose landing gear based upon one or more force-based inputs representative of lateral forces acting upon the nose landing gear, and controlling a steering actuator of the nose landing gear using the adjusted steering command.

The direction of travel is defined as the angle of the speed vector of a point, for example a point attached to the nose landing gear, with respect to a longitudinal axis of the aircraft, i.e. the aircraft centreline.

Lateral forces are defined as forces with a component perpendicular to a longitudinal axis and a vertical axis of the aircraft.

The invention is advantageous in that the steering command may be adjusted according to the received force based inputs, for example to maximise turning performance, control undercarriage loading and/or prevent skidding of the nose landing gear.

Preferably the steering input is a pilot defined steering input. The steering input may be, for example, a direction of travel steering input and/or a yaw rate steering input generated by operating a cockpit device. Alternatively the steering input may be generated by a control system such as an axis tracking system used for ground manoeuvring aircraft at airports.

The force-based inputs may include a closed-loop feedback signal representative of actual lateral force acting upon the nose landing gear. Preferably the lateral force signal is generated in real time.

The actual lateral force may, for example, be used to apply a correction to a lateral force command signal to minimise the error in the signal. In this way the lateral forces generated in the nose landing gear may be more accurately controlled. Manoeuvrability and stability of the aircraft may, therefore, be improved, and loading may be limited, thereby enabling a reduction in the design strength and therefore weight of the nose landing gear whilst still fulfilling operational requirements.

The force-based inputs may alternatively include an open-loop estimate of lateral force acting upon the nose landing gear.

The controller may calculate the lateral force estimate based upon one or more aircraft parameters and a predefined model stored in the controller.

The aircraft parameters may include aircraft longitudinal speed, aircraft lateral speed, aircraft yaw rate, aircraft nose wheel angle, or aircraft nose landing gear vertical force.

The controller may automatically revert to the open-loop estimate of lateral force when the closed-loop signal of actual lateral force is unavailable or is determined to be unreliable.

By generating an estimate of the lateral force acting on the nose landing gear and reverting to open loop control when the actual lateral force is not reliably available the controller may maintain accurate control of the lateral force generated by the nose landing gear in the case of sensor or component failures.

The controller may be configured to calculate a maximum nose landing gear lateral force for maintaining the lateral force within operational boundaries.

The controller may be configured to calculate the instantaneous maximum nose landing gear lateral force based upon the force-based input(s) representative of lateral forces acting upon the nose landing gear.

The controller may be configured to limit the adjustment to the steering input to ensure that the maximum nose landing gear lateral force is not exceeded. The adjustment to the steering input may be limited to ensure that a nose wheel slip angle remains within operational boundaries to maximise effectiveness of the steering performance in turning the aircraft.

By limiting the lateral force the controller may prevent the nose landing gear from skidding (i.e. uncontrolled side slip) over a runway surface. The controller may, therefore, provide slip protection, ensure efficient operation of the nose landing gear and increase manoeuvrability and lateral stability of the aircraft. The controller may also control loading of the landing gear, so that the design strength and therefore weight of the nose landing gear may be reduced. The maximum nose landing gear lateral force may be calculated based on dry, normal runway conditions.

The controller may be configured to calculate a desired nose landing gear lateral force to be generated based upon the steering input.

The desired lateral force calculation may utilise one or more aircraft parameters. The aircraft parameters may, for example, include aircraft mass, forces acting through each of a plurality of aircraft undercarriages and the positions of the undercarriages with respect to a centre of gravity of the aircraft.

The controller may be configured to calculate a desired nose wheel slip angle for achieving the desired nose landing gear lateral force.

The controller may be configured to compare the desired nose landing gear lateral force with a signal representative of actual or estimated lateral force acting on the nose landing gear, and to automatically adjust the steering input based upon any difference between these signals.

By adjusting the steering input the system may reduce the error, thereby increasing control over the actual nose landing gear lateral force.

The controller may be configured to calculate the instantaneous maximum nose wheel slip angle based upon the force-based input(s) representative of lateral forces acting upon the nose landing gear.

The controller may be configured to calculate a maximum nose wheel slip angle for maintaining the slip angle within operational boundaries.

The controller may be configured to limit the adjustment to the steering input to ensure that the maximum nose wheel slip angle is not exceeded. The adjustment to the steering input may be limited to ensure that a nose wheel slip angle remains within operational boundaries.

By limiting the nose wheel slip angle the controller may prevent the nose landing gear from skidding over a runway surface. The controller may, therefore, provide slip protection, ensure efficient operation of the nose landing gear and increase manoeuvrability and lateral stability of the aircraft.

The controller may be configured to modify the received steering input representing the desired direction of travel of the nose landing gear by limiting the rate of change of the direction of travel of the nose landing gear over time, in addition to the adjustment of the steering input based upon the force-based input(s).

The controller may be configured to output a signal representative of a braking force to be achieved by a braking system of the same aircraft so as to provide differential braking. Differential braking may be implemented automatically.

Differential braking means the intentional generation of unbalanced braking forces either side of the aircraft centre line to generate a net yaw moment to steer the aircraft.

By outputting a signal to provide differential braking the aircraft may increase the yaw moment generated by a plurality of aircraft undercarriages to ensure that steering operations may be completed, especially in adverse conditions or in failure modes. By activating differential braking automatically, for example without requiring the pilot to initiate differential braking, the pilot workload may be reduced.

The controller may be configured to split the steering input into a steering component to be accomplished by the steering system and a differential braking component to be accomplished by the braking system.

The controller may be configured to output the differential braking signal when the controller calculates that the lateral force required to achieve the desired direction of travel is higher than a predetermined threshold. The threshold may, for example, be a calculated maximum lateral force to be sustained by the nose landing gear.

The controller may be configured to output the differential braking signal when the controller determines that the steering actuator is unable to accomplish the steering command. The steering actuator may, for example, be unable to accomplish the steering command due to the steering command exceeding the performance envelope of the nose landing gear or due to a failure in a component of the nose landing gear.

The controller may be configured to split the steering input into a zero steering component and the differential braking component.

The controller may include an isolator switch to enable or disable the differential braking output signal.

The controller may be included in an aircraft steering system.

The steering command adjustment may be selectively activated, preferably by a pilot-controlled input. The steering command adjustment may also be selectively de-activated, preferably by a pilot-controlled input.

The steering system may further comprise a steering input device for receiving the steering input, and a steering actuator for directing a rotary steering angle of a steerable nose landing gear. The steering angle command to the steering actuator may remain invariant of lateral forces acting on the nose landing gear when the steering command adjustment is de-activated.

The controller may be configured to modify the received steering input representing the desired direction of travel of the nose landing gear by limiting the rate of change of the direction of travel of the nose landing gear over time, even when the automatic steering input adjustment function to account for lateral forces acting on the nose landing gear is de-activated.

The steering system may be included in an aircraft.

The aircraft may further comprise a braking system for decelerating the aircraft which is operably coupled to the steering system for performing differential braking.

BRIEF DESCRIPTION OF THE DRAWINGS

Embodiments of the invention will now be described with reference to the accompanying drawings, in which.

DETAILED DESCRIPTION OF EMBODIMENT(S)

Figure 1A:
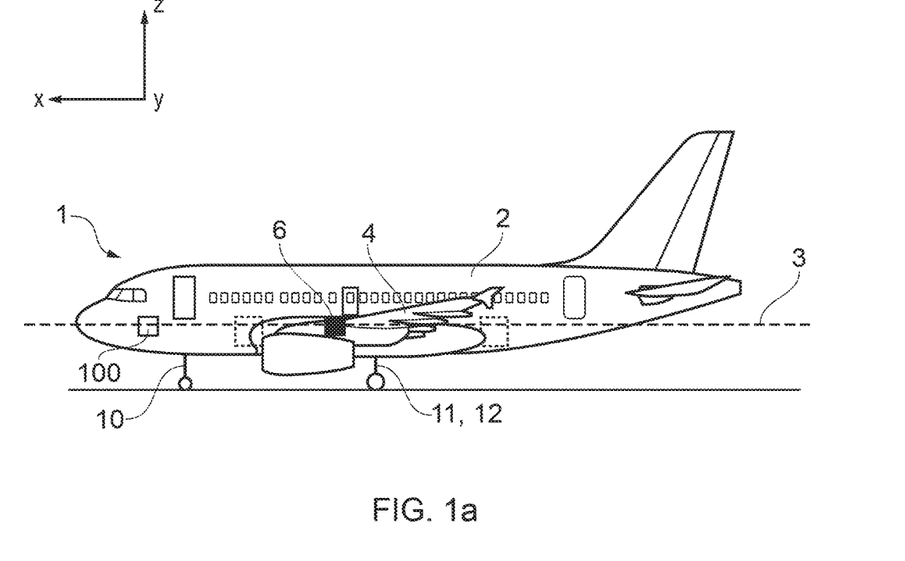
FIGS. 1a and 1b show an aircraft.
Figure 1B:
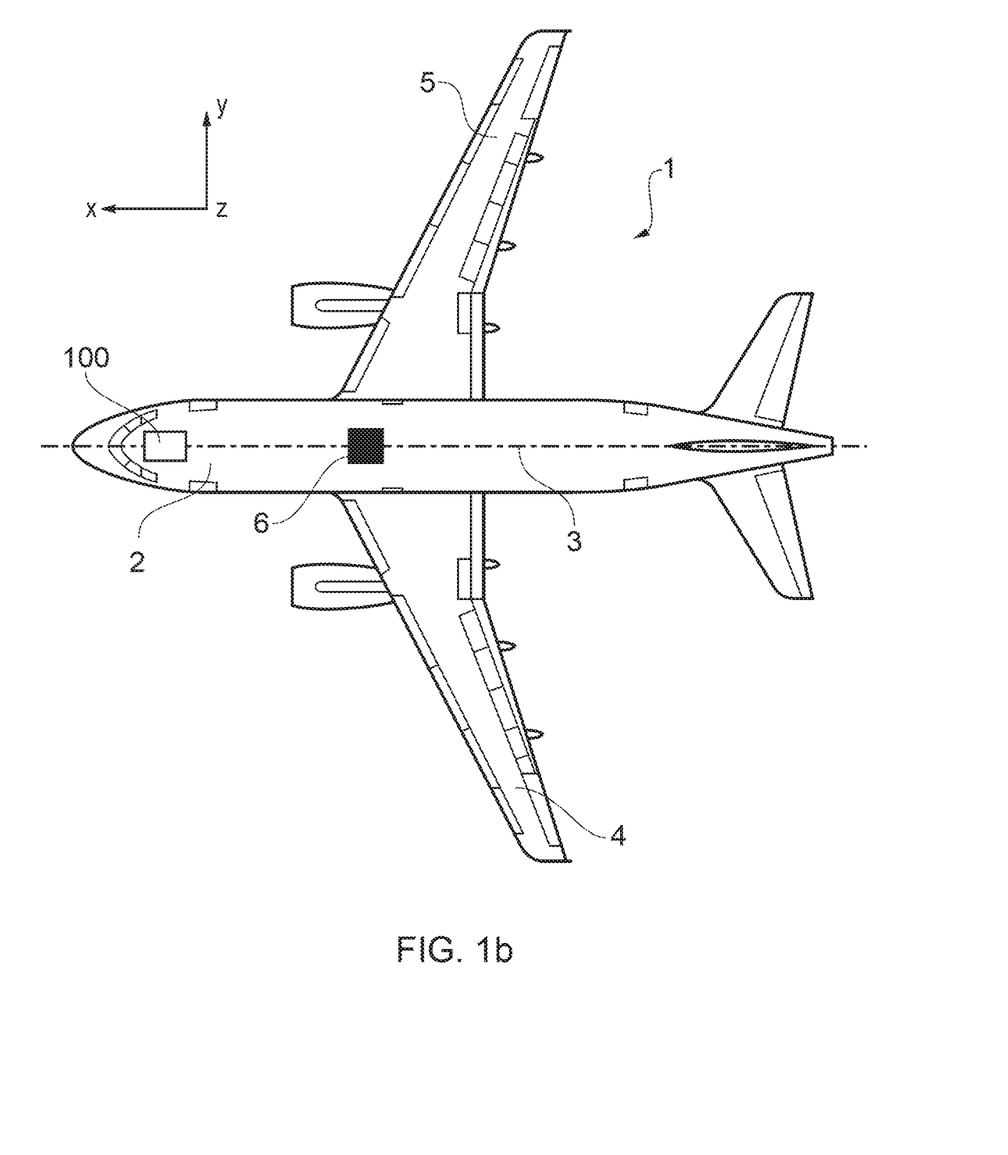

FIGS. 1a and 1b show an aircraft 1 having a fuselage 2 with a longitudinal axis 3 and wings 4, 5 extending outwardly from the fuselage. The aircraft 1 defines a set of axes with a longitudinal x direction parallel to the longitudinal axis of the aircraft, a lateral y direction perpendicular to the x axis, and a vertical z direction perpendicular to the x and y axes. The aircraft 1 has a centre of gravity 6.

The aircraft has landing gear which supports the aircraft when it is on the ground and controls the movement of the aircraft during ground manoeuvres such as landing, taxiing and take off. The landing gear comprises a nose landing gear (NLG) undercarriage 10 and port and starboard main landing gear (MLG) undercarriages 11, 12. The landing gear may be retracted when the aircraft 1 is in flight and extended before landing.

Figure 1C:
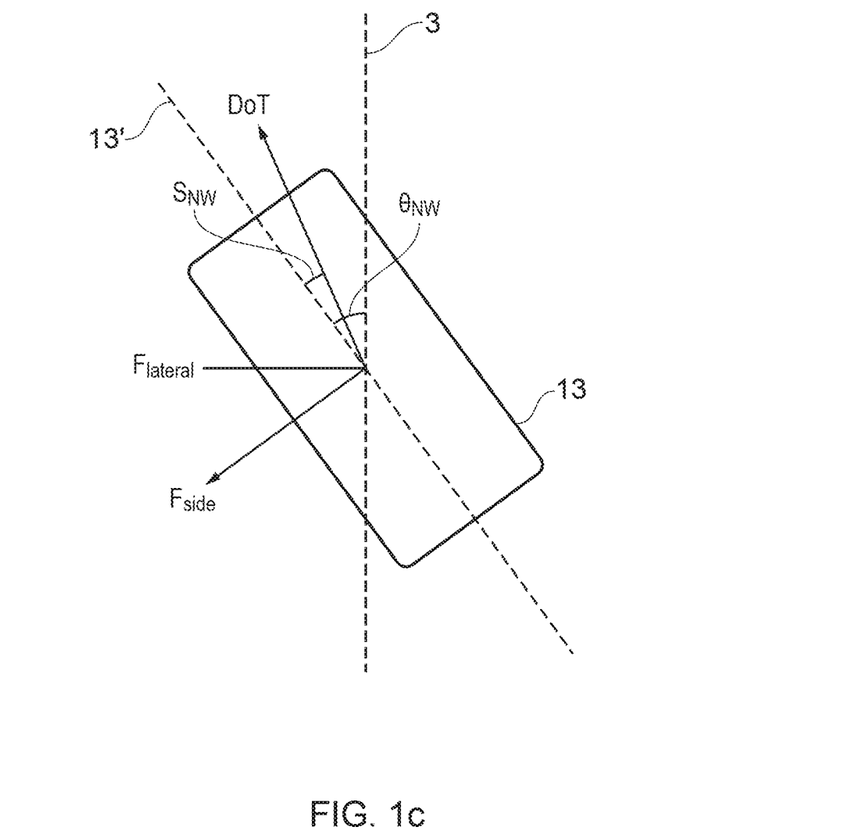
FIG. 1c shows a plan view of a steerable nose landing gear.

The NLG undercarriage 10 has a pair of steering wheels 13 which may be rotated by a steering actuator to steer the aircraft. The nose wheel angle $\theta_{NW}$ is defined as the angle between the direction in which the steering wheels are facing 13' (that is the direction in which the wheels roll in a direction perpendicular to the axis of rotation) and the longitudinal axis 3 of the aircraft 1, as indicated in FIG. 1c. The direction of travel of the aircraft (DoT) is defined as the direction of the speed vector of the NLG undercarriage 10 with respect to the longitudinal axis 3 of the aircraft 1. The nose wheel angle $\theta_{NW}$ may be varied to control the direction of travel of the NLG undercarriage 10, thereby controlling the heading of the aircraft.

When the steering wheels 13 are not aligned with the DoT, an angle known as the nose wheel slip angle SNW is created between the direction in which the steering wheels 13 are facing 13' and the DoT. When the steering wheels 13 are operated with a slip angle, a side force $F_{side}$ having a lateral component $F_{lateral}$ (in the y direction) is generated which results in a turning moment or yaw moment which acts to turn the aircraft. The net turning moment being generated in a particular direction may, therefore, be increased or decreased by applying a slip angle.

The MLG undercarriages 11, 12 each have a plurality of braking wheels 14 which may be operated to decelerate the aircraft. Each braking wheel is operated by using a brake actuator to apply a clamping force to a stack of carbon brake disks (stators and rotors) which transfers a braking torque to the braking wheel, resulting in a longitudinal deceleration force being transferred to the aircraft 1. The longitudinal braking force generated by each braking wheel may be controlled by operating the actuators to control the brake pressure of each brake. The brakes used in the embodiment described below may have a hydraulic brake actuator but a skilled person would appreciate that a similar control system using corresponding control methods could be employed regardless of the type of brakes, and could, for example be applied to an aircraft having electromechanical brake actuation and/or regenerative brakes.

In addition, the braking wheels may be used to help steer the aircraft through differential braking. Differential braking (DB) is the intentional application of unbalanced braking forces either side of the aircraft centre line 3 to generate a net yaw moment to steer the aircraft. DB may conventionally be achieved by asymmetric deflection of a pair of brake control devices for controlling port and starboard braking undercarriages. Braking and steering operations may also be assisted by other systems, for example spoilers and other control surfaces and the aircraft's engines.

The aircraft 1 includes a cockpit device for longitudinal control which is used to control deceleration of the aircraft and which outputs signals representative of a desired speed or deceleration, ie a speed command U* or a deceleration command U'*. The aircraft 1 also includes a cockpit device for lateral control which is used to steer the aircraft and which outputs signals representative of a desired direction of travel (DoT) and yaw rate, ie a DoT command β and a yaw rate command r*.

Figure 2:
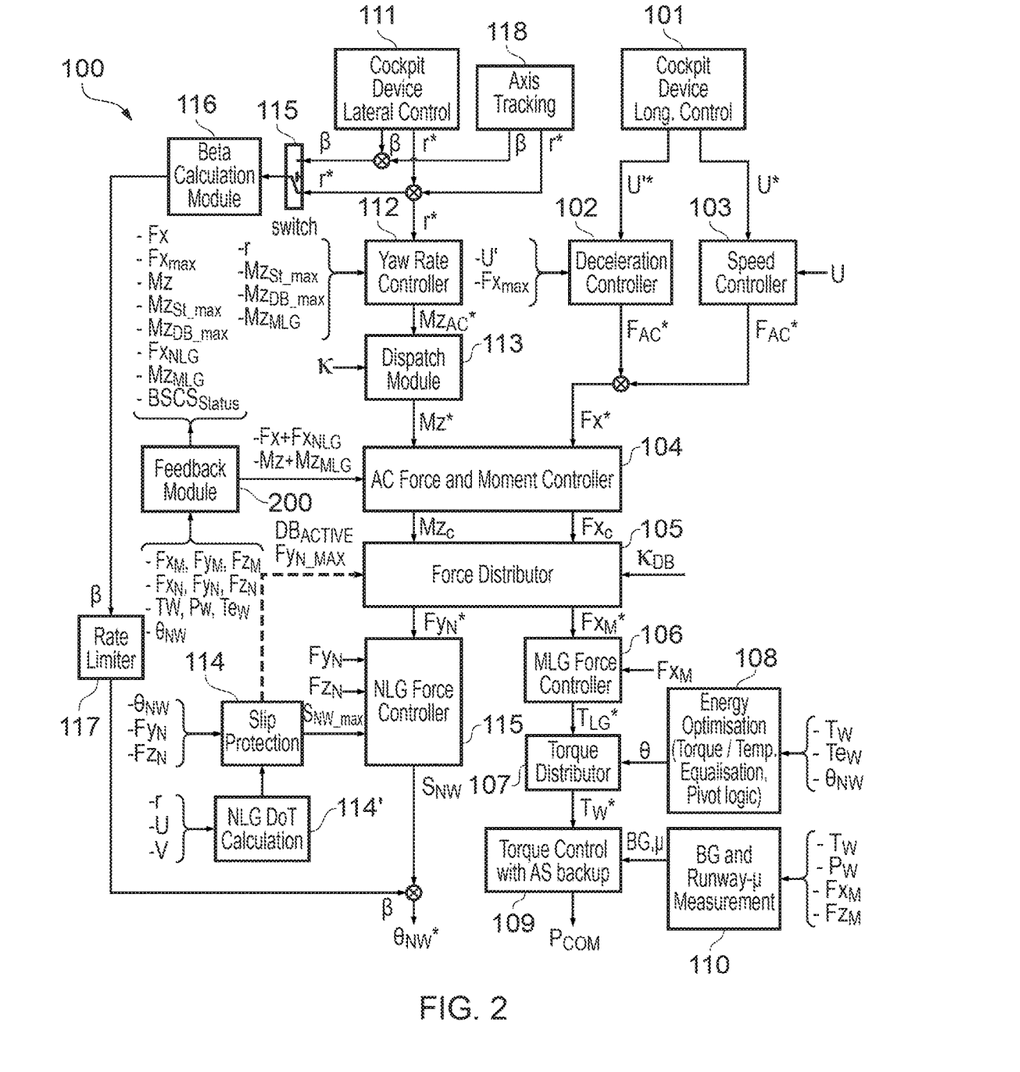
FIG. 2 shows a braking and steering control system.
Figure 3:
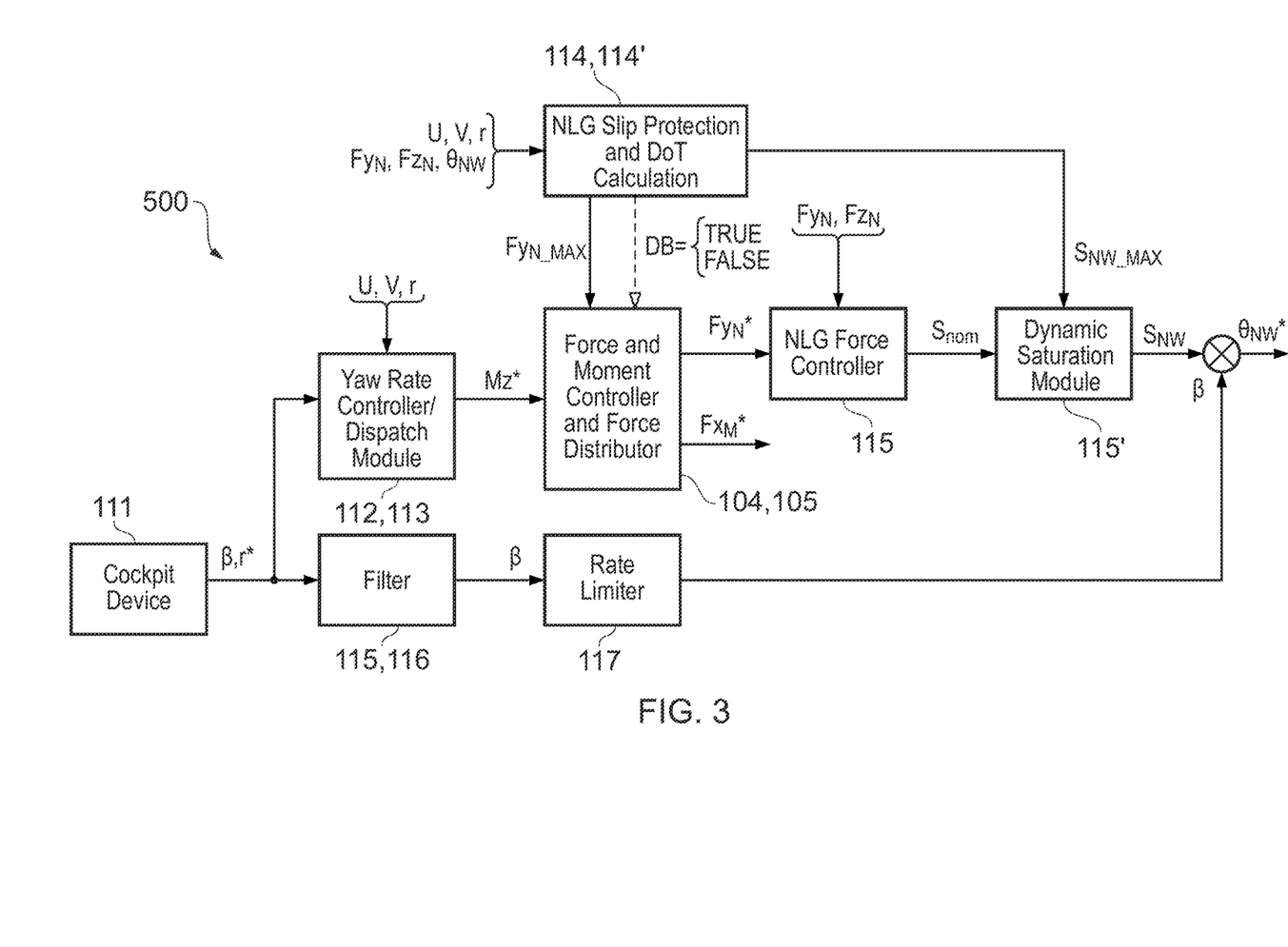
FIG. 3 shows a part of the steering and control system of FIG. 2.
Figure 4:
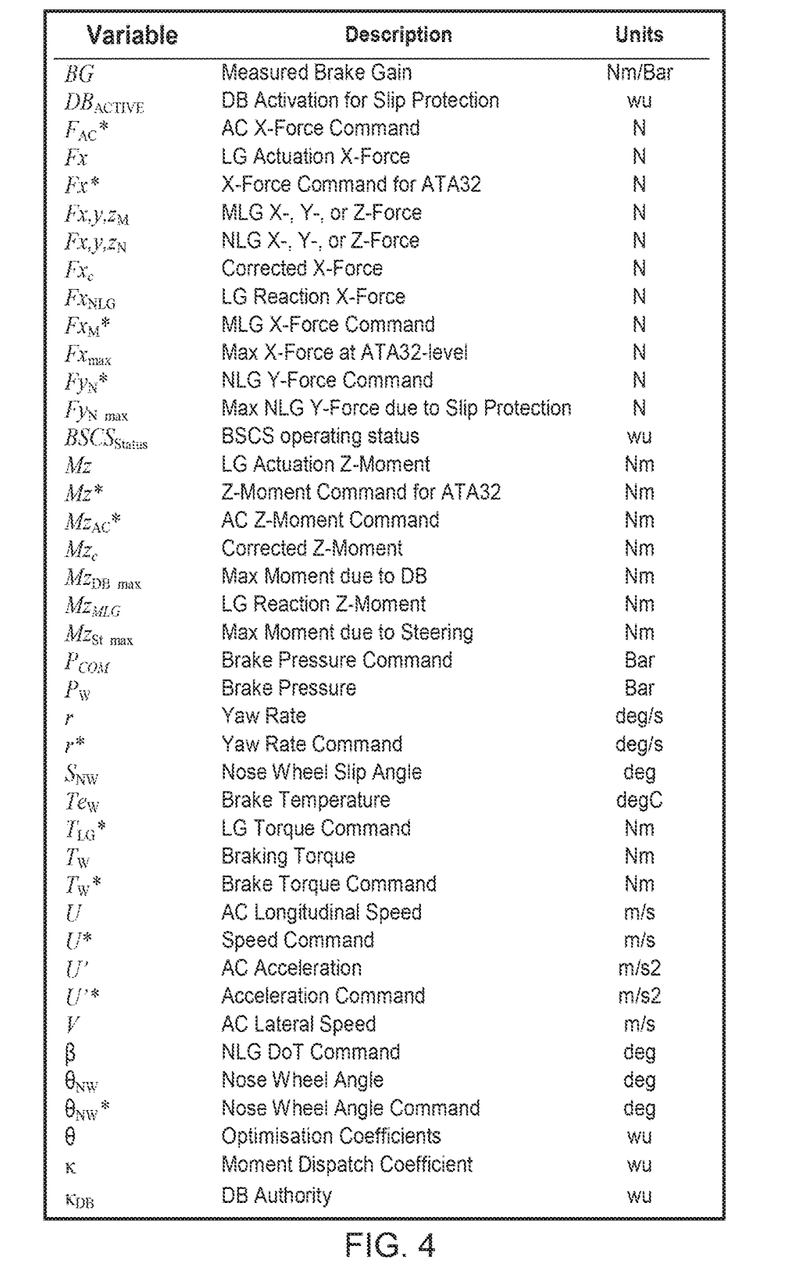
FIG. 4 is a table of symbols used in FIGS. 2 and 3.

FIG. 2 shows a braking and steering control system 100 of the aircraft 1 having a data processing unit or feedback module in accordance with an embodiment of the invention. FIG. 3 shows a simplified view of a part of the braking and steering control system with a feedback module or data processing unit in one possible embodiment of the invention. The skilled person will appreciate that the functionality and advantages of the feedback module are not dependent on the specific features of the aircraft 1 and the braking and steering control system 100, and that a similar feedback module may equally be used to monitor the performance of any aircraft undercarriage(s) used for braking and/or steering.

The braking and steering control system 100 is generally configured to receive input commands representative of a desired speed U*, deceleration U'*, DoT β or yaw rate r* and to transmit output commands—brake pressure command, $P_{COM}$, and nose wheel angle command, $\theta_{NW}$*—to braking and steering actuators to control the operation of the braking and steering wheels to control movement of the aircraft 1 in accordance with the input commands.

Each deceleration command U'* output by the longitudinal control device 101 is received by a deceleration controller 102 which also receives data representative of the current aircraft deceleration (negative acceleration) U' and the maximum achievable braking force $Fx_{max}$ to be generated by the MLG undercarriages 11, 12 from a feedback module 200. The deceleration controller 102 uses this data to determine the longitudinal braking force required to achieve the commanded deceleration for the aircraft 1 and outputs this value as a longitudinal force command $F_{AC}$*.

Each speed command U* output by the longitudinal control device 101 is similarly received by a speed controller 103 which also receives data representative of the current aircraft speed U. The speed controller 103 applies a speed control law to convert the speed command U* to a longitudinal force command $F_{AC}$* which is representative of the longitudinal braking force required to achieve or maintain the commanded speed for the aircraft 1 and outputs the longitudinal force command.

The longitudinal force command $F_{AC}$* (originating either as an acceleration command or a speed command) is received by an aircraft force and moment controller 104 as an x direction force command Fx*. The aircraft force and moment controller 104 also receives data representative of the longitudinal braking force Fx and the NLG x-direction reaction force $Fx_{NLG}$ from a feedback module 200. The force and moment controller 104 uses the current MLG undercarriage longitudinal forces to apply a correction to the x direction force command Fx*, and outputs a corrected force command $Fx_c$.

The corrected force command $Fx_c$ is received by a force distributor 105 which divides the total corrected force command into two MLG braking force commands $Fx_M$*, one for each of the two MLG undercarriages 11, 12, and outputs the MLG braking force commands to the MLG undercarriages. For clarity, FIG. 1 only shows one of the MLG force commands $Fx_M$* being output to one of the MLG undercarriages, however each of the MLG undercarriages 11, 12 have similar control system elements downstream of the force distributor 105 and function similarly.

Each MLG undercarriage 11, 12 has a MLG force controller 106 which receives the MLG braking force command $Fx_M$* from the force distributor 105 and a MLG longitudinal force signal $Fx_M$ representative of the longitudinal force currently generated by that MLG undercarriage FxM from a landing gear load sensor (e.g. a strain gauge). The MLG force controller 106 uses the braking force command $Fx_M$* and the current longitudinal force $Fx_M$ to determine the total braking torque to be generated at the braking wheels 14 of that undercarriage to achieve the commanded longitudinal force, and outputs a landing gear torque command $T_{LG}$* representative of the total braking torque to be generated by the braking wheels 14 of that undercarriage.

The landing gear torque command $T_{LG}$* is received by a torque distributor 107 which also receives optimisation coefficients θ for each braking wheel 14 from a braking energy optimiser 108. The torque distributor 107 uses the overall torque command for that undercarriage $T_{LG}$* and the torque coefficients θ for each braking wheel 14 to determine a braking torque to be generated by each wheel and outputs a wheel specific brake torque command $T_W$* to each braking wheel of the undercarriage which is representative of the braking torque to be generated by that braking wheel. For clarity, FIG. 1 only shows one wheel brake torque command $T_W$* being transmitted to one of the braking wheels 14, although each braking wheel of each MLG undercarriage receives a respective wheel brake torque command $T_W$* and is operated similarly.

Each braking wheel has a torque controller 109 and a brake gain and runway friction measurement unit 110 which calculates BG and the tyre-runway friction coefficient using input signals from various landing gear sensors. Each torque controller 109 receives the torque command intended for its wheel from the force controller 106 and signals representative of measured brake gain BG and tyre-runway friction μ from the brake gain and runway friction measurement unit 110 and determines a brake pressure required to achieve the commanded braking torque for its braking wheel 14. Each torque controller 109 then outputs a brake pressure command $P_{COM}$ representative of the desired brake pressure to the brake actuator for its wheel. The torque controller 109 has anti skid functionality to reduce or eliminate skidding by limiting the brake pressure command $P_{COM}$ if the wheel begins to skid.

The brake pressure commands $P_{COM}$ for each braking wheel 14 are received by brake servo controllers for the brake actuators for each respective braking wheel, causing the brake actuators to apply pressure to the brakes in accordance with the brake pressure commands $P_{COM}$, thereby decelerating the aircraft 1.

The braking and steering control system 100 includes a steering system controller 500 as shown in FIG. 3. The steering system controller 500 receives a steering input representative of a desired steer angle (DoT command β) and automatically adjusts the steering input according to the lateral forces experienced by the NLG undercarriage.

Each yaw rate command r* output by the lateral control device 111 is received by a yaw rate controller 112 which also receives data representative of the current aircraft yaw rate r, the maximum achievable turning moment to be generated by steering using the steering wheels $Mz_{St\_max}$, the maximum achievable turning moment to be generated by differential braking $MZ_{DB\_max}$ and the MLG reaction moment $MZ_{MLG}$ (ie reaction moment from the MLG undercarriages 11, 12 to changes in yaw) from the feedback module 200. The yaw rate controller 112 uses this data to determine a yaw moment about the z axis which is required to achieve the commanded yaw rate for the aircraft 1, and outputs an aircraft yaw moment command $Mz_{AC}$* representative of the required yaw moment.

The aircraft yaw moment command $Mz_{AC}$* is received by a dispatch module 113 which also receives a moment dispatch coefficient κ representative of the operating conditions of the runway and/or the aircraft. The dispatch coefficient may be used to apply a correction factor or a limit to the yaw moment command $Mz_{AC}$*. The dispatch module outputs a z moment command Mz* representative of the desired yaw moment to be generated by the landing gear.

The z moment command Mz* is received by the aircraft force and moment controller 104 which also receives data representative of the yaw moment due to steering Mz and the yaw moment reaction force from the MLG undercarriages $Mz_{MLG}$ from the feedback module 200. The force and moment controller 104 uses the current aircraft turning moment to reduce the error in the z moment command Mz*, and outputs a corrected yaw moment command $Mz_c$. By reducing the yaw moment command error, the yaw moment feedback loop increases control of the yaw moment generated by the undercarriages.

The steering system controller 500 includes a NLG slip protection module 114 which receives signals representative of the nose wheel angle $θ_{NW}$, NLG lateral force $Fy_N$ and NLG-ground reaction force $FZ_N$ from a nose wheel position sensor and load sensors in the NLG undercarriage structure. The slip protection module 114 also receives a signal representative of the DoT from a NLG DoT calculation module 114', which calculates the DoT based on the current aircraft yaw rate r, longitudinal speed U and lateral speed V. The slip protection module calculates a maximum lateral force $Fy_{N\_MAX}$ which may be generated by the steering wheels 13 of the NLG undercarriage 10 (in the y direction) and a maximum slip angle $S_{NW\_max}$ at which the steering wheels may be operated to establish the current operational boundaries of the NLG undercarriage.

The force distributor 105 receives the corrected yaw moment command Mzc from the force and moment controller 104 and a maximum lateral force signal $Fy_{N\_MAX}$ from the slip protection module 114. The force distributor 105 outputs an NLG lateral force command $Fy_N$* representative of the lateral force to be generated by the NLG undercarriage 10 to achieve the commanded yaw moment command $Mz_c$. The maximum lateral force $Fy_{N\_MAX}$ is used to limit the lateral force command so that it does not exceed the boundary established by the slip protection module 114.

If the lateral force from the NLG undercarriage required to achieve the commanded yaw moment ($Mz_c$) exceeds the maximum lateral force $Fy_{N\_MAX}$ to be generated by the steering wheels 13 (ie the commanded yaw moment cannot be generated by steering the steering wheels), the slip protection module 114 outputs a DB activation signal $DB_{ACTIVE}$ to the force distributor 105 to activate differential braking. The force distributor 105 responds by outputting a lateral braking force command $F_{xM}*$ to one or both of the MLG undercarriages 11, 12 to operate differential braking to increase the yaw moment generated by the undercarriages so that the desired steering manoeuvre may be completed. Differential braking may be enabled or disabled by the pilot or by a control system as desired.

By limiting the NLG lateral force command $Fy_N*$, the steering system controller 500 can maintain operation of the steering wheels 13 within the available performance envelope of the NLG undercarriage, thereby preventing skidding of the steering wheels which may lead to reduced control and reduced turning performance. The steering system controller 500 therefore improves manoeuvrability and lateral stability of the aircraft, particularly if a tight turning manoeuvre is attempted or if the aircraft is operated in adverse conditions such as on a runway with a low coefficient of friction (e.g. wet or icy conditions) or in crosswinds or gusts.

By limiting the lateral force generated by the NLG undercarriage, the steering system controller 500 also improves control over loading of the NLG undercarriage, so that the design strength and therefore the weight of the aircraft may be reduced.

By splitting the yaw moment into a component to be achieved by steering and a component to be achieved by differential braking, the steering system controller 500 may improve manoeuvrability of the aircraft and increase the maximum turning performance. The aircraft may therefore complete a turning manoeuvre which could not have been completed using only the steering wheels 13 to steer the aircraft. This offers a particular advantage if the aircraft is operated in adverse conditions when it may be difficult to effectively control steering of the aircraft or achieve a desired yaw moment. The pilot workload is also reduced because the pilot is not required to manually control the brakes to generate a yaw moment if DB is activated automatically in response to the steering input.

If a component or system failure reduces the ability of the NLG undercarriage 13 to steer the aircraft or even prevents the NLG from steering the aircraft, for example in the case of a steering actuator failure, the force distributor 105 responds by outputting a lateral braking force command $F_{xM}*$ to one or both of the MLG undercarriages 11, 12 to fully accomplish the commanded yaw moment through differential braking. The steering system controller 500 therefore improves control of the aircraft in failure modes.

A NLG force controller 115 receives the NLG lateral force command $Fy_N*$ from the force distributor 105 and data representative of the normal reaction force between the steering wheels 13 and the runway $FZ_N$ (ie force in the z direction) and the current lateral steering force $Fy_N$ (ie force in the y direction) from load sensors in the NLG undercarriage structure. The NLG force controller 115 uses the current lateral force in a closed feedback loop to minimise the error in the NLG lateral force command $Fy_N*$. Preferably the actual current lateral force is measured and used in a closed feedback loop. However, if the current lateral force is unavailable or is judged to be unreliable the force controller 115 is adapted to calculate an estimated lateral force based on other measured and pre-determined aircraft parameters to provide open loop control of the lateral force command $Fy_N*$. The NLG force controller 115 then calculates a nominal slip angle $S_{nom}$ required to generate the corrected lateral force command.

By using the current lateral force in a closed feedback loop to reduce the error in the NLG lateral force command $Fy_N*$ the steering system controller 500 improves control over steering manoeuvres, thereby increasing manoeuvrability and lateral control of the aircraft. By providing an open loop estimate of the lateral force in the NLG undercarriage, the steering system controller 500 provides accurate control of steering performance and undercarriage loading in the case of sensor failures or sensor signal deterioration.

The NLG force controller 115 includes a dynamic saturation module 115' (included in block 115 in FIG. 2) which receives the nominal slip angle $S_{nom}$ and a signal from the slip protection module 114 representative of the maximum slip angle $S_{NW\_max}$ to avoid skidding of the steering wheels 13. The dynamic saturation module 115' limits the nominal slip angle $S_{nom}$ as dictated by the maximum slip angle $S_{NW\_max}$ and outputs a slip angle command $\theta_{NW}$.

By limiting the slip angle command $\theta_{NW}*$, the steering system controller 500 prevents over-rotation of the steering wheels which may result in skidding and an associated loss in turning performance of the aircraft. The manoeuvrability and lateral stability of the aircraft is therefore increased, particularly under adverse conditions.

The NLG force controller 115 also uses the current lateral force $Fy_N$ generated in the nose landing gear to detect unwanted yaw moments causing changes in heading which do not correspond to a change in a steering input command. Unwanted changes in heading may, for example, be caused by crosswinds or gusts or asymmetric braking. If an unwanted change in heading is detected, the NLG force controller 115 responds by adjusting the slip angle command to control the lateral force generated by the steering wheels 13 to counteract the undesired yaw moment.

By automatically counteracting undesired yaw moments, the steering system controller 500 increases control of the aircraft's heading and reduces the need for the pilot and/or axis tracking control systems to correct undesired changes in heading, thereby reducing pilot and control system workloads.

When the lateral control device 111 outputs a DoT command β and a yaw rate command r*, the commands pass through a switch 115 which is used to select either the DoT command β or the yaw rate command r*. If the yaw rate command r* is selected a beta calculation module 116 calculates a DoT command β based on the inputted yaw rate command r* to achieve the desired yaw rate. If the DoT command β is selected the DoT command bypasses the beta calculation module 116 and is not changed. The DoT command β (originating either as DoT command or a yaw rate command from the lateral control device) then passes through a rate limiter 117 which acts to limit the rate of change of the DoT command.

The limited DoT command β and the nose wheel slip angle $S_{NW}$ output by the NLG force controller 115 are then combined to give a nose wheel angle command $\theta_{NW}*$ representative of the desired nose wheel angle. The nose wheel angle command $\theta_{NW}*$ is received by a steering servo controller for the steering actuator which sets the nose wheel angle to steer the aircraft 1. In this way the slip angle $S_{NW}$ automatically adjusts the pilot defined DoT steering input to output an adjusted steering command, and the adjustment is limited to maintain lateral loading $Fy_N$ and the slip angle $S_{NW}$ within operational boundaries.

Automatic adjustment of the steering command may be enabled or disabled by the pilot or a control system as desired. Automatic adjustment of the steering command is disabled so that the nose wheel angle command $\theta_{NW}*$ is proportional to the DoT command and no slip protection is introduced to adjust the nose wheel angle command $\theta_{NW}^*$.

An axis tracking module 118 is also provided which may be used to automatically output a DoT command $\beta$ and a yaw rate command r* when the pilot requests automatic steering of the aircraft 1 to a desired location. The DoT command $\beta$ and a yaw rate command r* output by the tracking module 118 are used in the same way as the equivalent commands from the lateral control device 111 as discussed above.

In an alternative embodiment the steering system controller may not be part of an integrated braking and steering control system, and may not be coupled to a braking system to perform differential braking.

In an alternative embodiment the steering system controller may not include all of the feedback loops described in the above embodiment and/or may include additional feedback loops.

In an alternative embodiment the steering system controller may adjust steering commands sent to any number of steering wheels of any number of steering undercarriages.

A steering system controller in accordance with the invention may be designed into an aircraft steering system or may be retro-fitted, for example to an in-service aircraft steering system.

Although the invention has been described above with reference to one or more preferred embodiments, it will be appreciated that various changes or modifications may be made without departing from the scope of the invention as defined in the appended claims.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft steering system comprising:
a steerable nose-landing gear, and
controller configured:
to receive a steering input representative of a desired direction of travel of the steerable nose landing gear, and
to receive one or more force-based inputs representative of lateral forces acting upon the nose landing gear,
wherein the lateral forces are forces with a component in a lateral direction perpendicular to a longitudinal axis and a vertical axis of the aircraft, and
wherein the controller is adapted to automatically adjust the steering input based upon the one or more force-based inputs and output an adjusted steering command for a steering actuator of the nose landing gear.

2. The aircraft steering system according to claim 1, wherein the one or more force-based inputs include a closed-loop feedback signal representative of actual lateral force acting upon the nose landing gear.

3. The aircraft steering system according to claim 2 wherein the one or more force-based inputs include an open-loop estimate of lateral force acting upon the nose landing gear and wherein the controller is configured to automatically revert to the open-loop estimate of lateral force when the closed-loop signal of actual lateral force is unavailable or is unreliable.

4. The aircraft steering system according to claim 1 wherein the one or more force-based inputs include an open-loop estimate of lateral force acting upon the nose landing gear.

5. The aircraft steering system according to claim 4, wherein the controller is configured to calculate the estimated lateral force estimate based upon one or more aircraft parameters and a pre-defined model stored in the controller.

6. The aircraft steering system according to claim 1, wherein the controller is configured to calculate a maximum nose landing gear lateral force for maintaining the lateral force within operational boundaries.

7. The aircraft steering system according to claim 6, wherein the controller is configured to calculate the maximum nose landing gear lateral force based upon the one or more force-based inputs representative of lateral forces acting upon the nose landing gear.

8. The aircraft steering system according to claim 6, wherein the controller is configured to limit the adjustment to the steering input to ensure that the maximum nose landing gear lateral force is not exceeded.

9. The aircraft steering system according to claim 1, wherein the controller is configured to calculate a desired nose landing gear lateral force to be generated based upon the steering input.

10. The aircraft steering system according to claim 9, wherein the controller is configured to compare the desired nose landing gear lateral force with a signal representative of actual or estimated lateral force acting on the nose landing gear, and to automatically adjust the steering input based upon any difference between these signals.

11. The aircraft steering system according to claim 1, wherein the controller is configured to calculate an instantaneous maximum nose wheel slip angle based upon the one or more force-based inputs representative of lateral forces acting upon the nose landing gear.

12. The aircraft steering system according to claim 1, wherein the controller is configured to calculate a maximum nose wheel slip angle for maintaining the slip angle within operational boundaries.

13. The aircraft steering system according to claim 12, wherein the controller is configured to limit the adjustment to the steering input to ensure that the maximum nose wheel slip angle is not exceeded.

14. The aircraft steering system according to claim 1, wherein the controller is configured to output a signal representative of a braking force to be achieved by a braking system of the same aircraft so as to provide differential braking.

15. The aircraft steering system according to claim 14, wherein the controller is configured to split the steering input into a steering component to be accomplished by the steering system and a differential braking component to be accomplished by the braking system.

16. The aircraft steering system according to claim 14, wherein the controller is configured to output the differential braking signal when the controller determines that the steering actuator is unable to accomplish the steering command.

17. The aircraft steering system according to claim 1, wherein the automatic steering input adjustment function is selectively activated.

18. The aircraft steering system according to claim 17, further comprising a steering input device for receiving the steering input, and a steering actuator for directing a rotary steering angle of a steerable nose landing gear, wherein the steering command to the steering actuator remains invariant of lateral forces acting on the nose landing gear when the automatic steering input adjustment function is de-activated.

19. An aircraft including the aircraft steering system of claim 1.

20. The aircraft according to claim 19, further comprising a braking system for decelerating the aircraft and operably coupled to the steering system for performing differential braking.

21. A method of steering an aircraft, the method comprising:
- automatically adjusting, by a controller, a steering input representative of a desired direction of travel of a steerable nose landing gear of the aircraft based upon one or more force-based inputs representative of lateral forces acting upon the nose landing gear, wherein the lateral forces are forces with a component in a lateral direction perpendicular to a longitudinal axis and a vertical axis of the aircraft, and
- controlling a steering actuator of the nose landing gear using the adjusted steering command.

* * * * *